United States Patent
Matsuo et al.

(10) Patent No.: US 10,661,826 B2
(45) Date of Patent: May 26, 2020

(54) STEERING CONTROL UNIT

(71) Applicant: JTEKT CORPORATION, Osaka-shi, Osaka (JP)

(72) Inventors: Shigeto Matsuo, Hyogo (JP); Yoshihiko Sugimoto, Yamatotakada (JP); Akihiko Nishimura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 37 days.

(21) Appl. No.: 16/122,010

(22) Filed: Sep. 5, 2018

(65) Prior Publication Data

US 2019/0077448 A1  Mar. 14, 2019

(30) Foreign Application Priority Data

Sep. 12, 2017  (JP) ................................. 2017-174791

(51) Int. Cl.
B62D 5/04 (2006.01)

(52) U.S. Cl.
CPC ......... *B62D 5/0466* (2013.01); *B62D 5/0463* (2013.01); *B62D 5/0472* (2013.01)

(58) Field of Classification Search
CPC ... B62D 5/0466; B62D 5/0463; B62D 5/0472
See application file for complete search history.

(56) References Cited

U.S. PATENT DOCUMENTS

| 2015/0066306 | A1  | 3/2015 | Kodera |           |
|--------------|-----|--------|--------|-----------|
| 2018/0050723 | A1* | 2/2018 | Jung   | B62D 5/0466 |
| 2018/0065660 | A1* | 3/2018 | Aoki   | B62D 5/0409 |
| 2019/0002014 | A1* | 1/2019 | Shah   | B62D 5/046 |
| 2019/0023318 | A1* | 1/2019 | Mitsuishi | B62D 6/002 |
| 2019/0039641 | A1* | 2/2019 | Toda   | B62D 5/0463 |
| 2019/0126975 | A1* | 5/2019 | Prahlad | B62D 5/0472 |
| 2019/0225262 | A1* | 7/2019 | Polmans | B62D 3/12 |

(Continued)

FOREIGN PATENT DOCUMENTS

| EP | 2 842 838 A1  | 3/2015 |
| EP | 3 210 851 A2  | 8/2017 |
| JP | 2015-047881 A | 3/2015 |

OTHER PUBLICATIONS

Feb. 13, 2019 Extended Search Report issued in European Patent Application No. 18193509.9.

*Primary Examiner* — Sze-Hon Kong
(74) *Attorney, Agent, or Firm* — Oliff PLC

(57) ABSTRACT

The microcomputer included in the steering control unit calculates a basic assist component that is a component of the assist force, on the basis of the steering torque. The microcomputer calculates a damping compensation component that suppresses a sudden change in a rotation angle, on the basis of a rotational angular velocity that is a time rate of change of the rotation angle. The microcomputer calculates, independently of the damping compensation component, a return compensation component that suppresses influence of the damping compensation component, on the basis of the rotational angular velocity. The microcomputer compensates the basic assist component by using both the damping compensation component and the return compensation component, in a situation where the steering wheel comes back to the neutral position without a steering operation that a driver performs to return the steering wheel.

7 Claims, 5 Drawing Sheets

(56) References Cited

U.S. PATENT DOCUMENTS

2019/0337556 A1* 11/2019 Tsubaki ................. B62D 6/007
2019/0359251 A1* 11/2019 Shimokawabe ..... B62D 5/0466
2020/0010111 A1* 1/2020 Tsubaki ................. B62D 6/007

* cited by examiner

STEERING CONTROL UNIT

INCORPORATION BY REFERENCE

The disclosure of Japanese Patent Application No. 2017-174791 filed on Sep. 12, 2017 including the specification, drawings and abstract is incorporated herein by reference in its entirety.

BACKGROUND OF THE INVENTION

1. Field of the Invention

The invention relates to a steering control unit.

2. Description of Related Art

Japanese Patent Application Publication No. 2015-047881 (JP 2015-047881 A) discloses an electric power steering system that supplies a steering mechanism of a vehicle with the torque of a motor as an assist force. In order to provide a driver with a better steering feel, a steering control unit of this electric power steering system calculates a damping compensation value that compensates to reduce a sudden change in a steering angle that is a rotation angle of a steering wheel.

According to JP 2015-047881 A, the effect of the damping compensation value works also in a situation where, after being turned, the steering wheel comes back to its neutral position by the action of self aligning torque, without a steering operation that a driver performs to return the steering wheel. In this case, the effect of the damping compensation value works in a direction opposite to a direction in which the steering wheel moves when coming back to the neutral position. Thus, the damping compensation value interferes with the action of self-aligning torque, although helping to reduce a sudden change in the steering angle that occurs when the steering wheel comes back to the neutral position. This may cause a decrease in the speed of the steering wheel coming back to the neutral position. As such, there is a trade-off between improving a steering feel and adjusting the speed of a steering wheel corning back to its neutral position.

SUMMARY OF THE INVENTION

A purpose of the invention is to provide a steering control unit that provides an improved steering eel and allows adjustment of the speed of a steering wheel coming back to its neutral position.

According to an aspect of the invention, a steering control unit includes: a control circuit that controls the driving of a motor on the basis of an operating state quantity that changes in response to a steering operation that a driver performs to turn or return a steering wheel of a steering mechanism so as to steer a steered wheel of a vehicle. The motor is a source of an assist force to be supplied to the steering mechanism. The control circuit calculates, on the basis of the operating state quantity, a basic assist component that is a basic component of the assist force that the motor needs to produce. The control circuit calculates, as a compensation component, a damping compensation component on the basis of a steering angle of the steering wheel that changes in response to the steering operation performed by the driver, or on the basis of a rotational angular velocity that is a time rate of change of a rotation angle convertible to the steering angle. The damping compensation component is used to compensate the basic assist component to suppress a sudden change in the steering angle. The control circuit calculates, as a compensation component and independently of the damping compensation component, a return damping compensation component on the basis of the rotational angular velocity. The return damping compensation component is used to compensate the basic assist component to suppress influence of the damping compensation component. The control circuit compensates the basic assist component by using both the damping compensation component and the return damping compensation component, in a situation where the steering wheel comes back to its neutral position without the steering operation that the driver performs to return the steering wheel.

According to the aspect described above, in the situation where the steering wheel comes back to the neutral position without the steering operation that a driver performs to return the steering wheel, the basic assist component is compensated by using both the damping compensation component and the return damping compensation component, so that the influence of the damping compensation component is suppressed. Thus, the effect of the damping compensation component works in a situation where the driver intentionally operates the steering wheel, regardless of whether the steering wheel is turned or returned, but does not work in the situation where the steering wheel comes back to the neutral position. As such, in the situation where the steering wheel comes back to the neutral position, the interference of the damping compensation component with self-aligning torque is suppressed, so that a decrease in the speed of the steering wheel coming back to the neutral position is suppressed. This makes it possible to adjust the speed of the steering wheel coming back to the neutral position without affecting a steering feel, thus allowing adjustment of the speed of the steering wheel coming back to the neutral position while improving the steering feel.

The situation where the steering wheel comes back to the neutral position may occur regardless of whether the driver holds the steering wheel. For example, a situation where the driver holds the steering wheel with a force that is sufficiently small may be considered to be the situation where the steering wheel comes back to the neutral position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
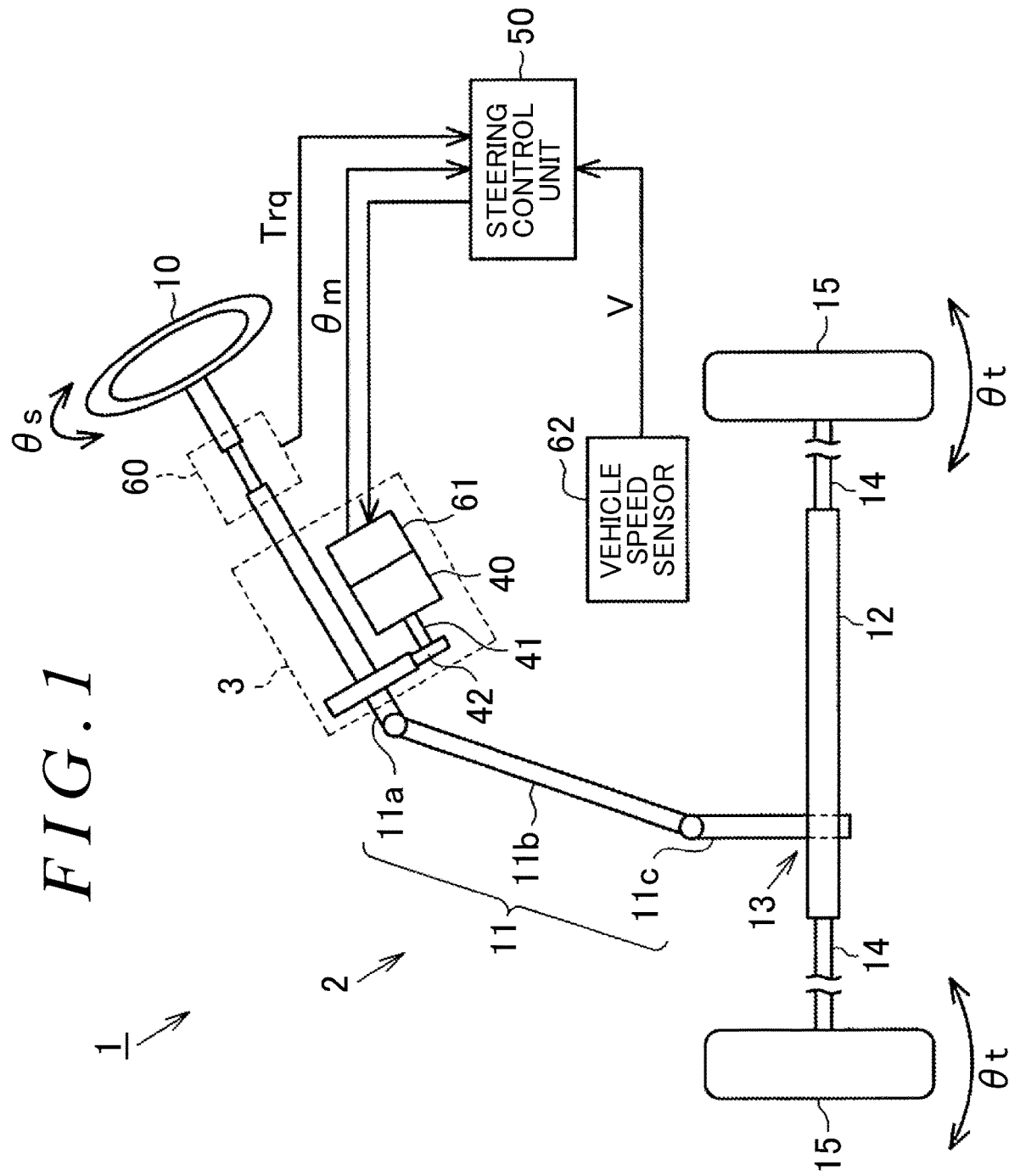
FIG. 1 is a diagram schematically illustrating an electric power steering system to be mounted on a vehicle.

A steering control unit according to an embodiment of the invention is described below. As illustrated in FIG. 1, an electric power steering system 1 includes the following: a steering mechanism 2 that steers steered wheels 15 in response to a steering operation that a driver performs to operate a steering wheel 10; and an assist mechanism 3 that assists a driver in performing the steering operation.

The steering mechanism 2 includes the steering wheel 10 and a steering shaft 11 that is fixed with respect to the steering wheel 10. The steering shaft 11 includes the following: a column shaft 11a coupled to the steering wheel 10; an intermediate shaft 111b coupled to the lower end of the column shaft 11a; and a pinion shaft 11c coupled to the lower end of the intermediate shall 11b. The lower end of the pinion shaft 11c is coupled, via a rack and pinion mechanism 13, to a rack shaft 12 serving as a steered shaft. The rack shaft 12 is supported by a rack housing that is not illustrated in the drawings. The right and left steered wheels 15 are respectively coupled to the right and left ends of the rack shaft 12 via tie rods 14. Thus, the rack and pinion mechanism 13, including the pinion shaft 11c and the rack shaft 12, converts rotary motion of the steering wheel 10, i.e., rotary motion of the steering shaft 11, to reciprocating linear motion of the rack shaft 12 in an axial direction (a lateral direction in FIG. 1). The reciprocating linear motion is transmitted to the steered wheels 15 via the tie rods 14 that are coupled to the respective ends of the rack shaft 12, and thus steered angles θt of the steered wheels 15 change.

The assist mechanism 3 includes a motor 40 that is a source of power (an assist force) to be supplied to the steering mechanism 2. For example, the motor 40 is a three-phase brushless motor and is rotated on the basis of three-phase (U, V, and W) driving electric power. A rotating shaft 41 of the motor 40 is coupled to the column shaft 11a via a speed reduction mechanism 42. The assist mechanism 3 converts, through the speed reduction mechanism 42, the rotational force of the rotating shaft 41 of the motor 40 to a force that causes the rack shaft 12 to linearly reciprocate the axial direction. This axial force applied to the rack shaft 12 serves as power (an assist force) to change the steered angles θt of the steered wheels 15.

As illustrated in FIG. 1, the motor 40 is connected to a steering control unit 50 that controls the driving of the motor 40. On the basis of results detected by various types of sensors, the steering control unit 50 controls a controlled variable for the motor 40, i.e., controls the supply of electric current to the motor 40, thereby controlling the driving of the motor 40. Examples of the sensors may include a torque sensor 60, a rotation angle sensor 61, and a vehicle speed sensor 62. The torque sensor 60 is provided to the column shaft 11a. The rotation angle sensor 61 is provided to the motor 40. The torque sensor 60 detects a steering torque Trq that is an operation state quantity generated at the steering shaft 11 and that changes in response to the steering operation performed by a driver. The rotation angle sensor 61 detects a rotation angle θm of the rotating shaft 41 of the motor 40. The vehicle speed sensor 62 detects a vehicle speed V that is the traveling speed of a vehicle.

Figure 2:
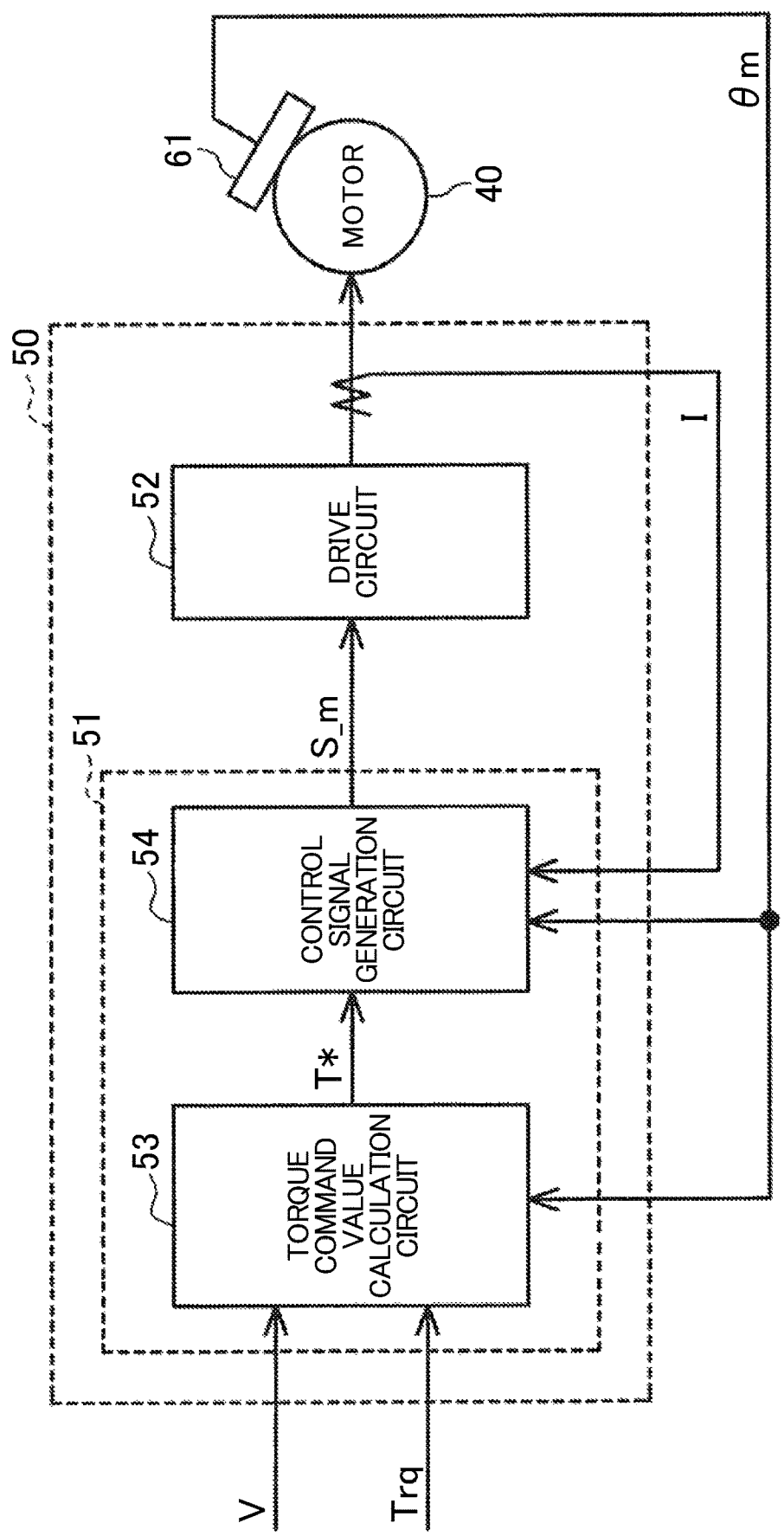
FIG. 2 is a block diagram illustrating the electrical structure of the electric power steering system.

Next, the electrical structure of the electric power steering system 1 is described. As illustrated in FIG. 2, the steering control unit 50 includes the following: a microcomputer 51 that generates a motor control signal S_m; and a drive circuit 52 that supplies electric current to the motor 40 on the basis of the motor control signal S_m. The microcomputer 51 receives an actual current I of the motor 40 and also receives the results detected by the torque sensor 60, the rotation angle sensor 61, and the vehicle speed sensor 62. The microcomputer 51 generates and outputs the motor control signal the form of a pulse width modulation (PWM) signal, to the drive circuit 52. According to the embodiment, the microcomputer 51 is an example of a control circuit.

Next, functions of the microcomputer 51 are described in detail. Although not illustrated in the drawings, the microcomputer 51 includes a central processing unit (CPU) and a memory device. The CPU executes a program stored in the memory device, thereby controlling the driving of the motor 40.

FIG. 2 illustrates some processes that are performed by the microcomputer 51. Specifically, in FIG. 2, some processes that are implemented when the CPU executes the program stored in the memory device are illustrated according to types of the processes.

The microcomputer 51 includes a torque command value calculation circuit 53 and a control signal generation circuit 54. The torque command value calculation circuit 53 receives the vehicle speed V, the steering torque Trq, and the rotation angle θm. The torque command value calculation circuit 53 calculates a torque command value T* on the basis of the vehicle speed V, the steering torque Trq, and the rotation angle θm. The torque command value T* is a target value for the amount of electric current corresponding to an assist force that the motor 40 needs to produce.

The control signal generation circuit 54 receives the torque command value T* calculated by the torque command value calculation circuit 53, the rotation angle θm, and the actual current I. The control signal generation circuit 54 generates the motor control signal S_m on the basis of the torque command value T*, the rotation angle θm, and the actual current I, and then outputs the motor control signal S_m, in the form of a PWM signal, to the drive circuit 52.

Figure 3:
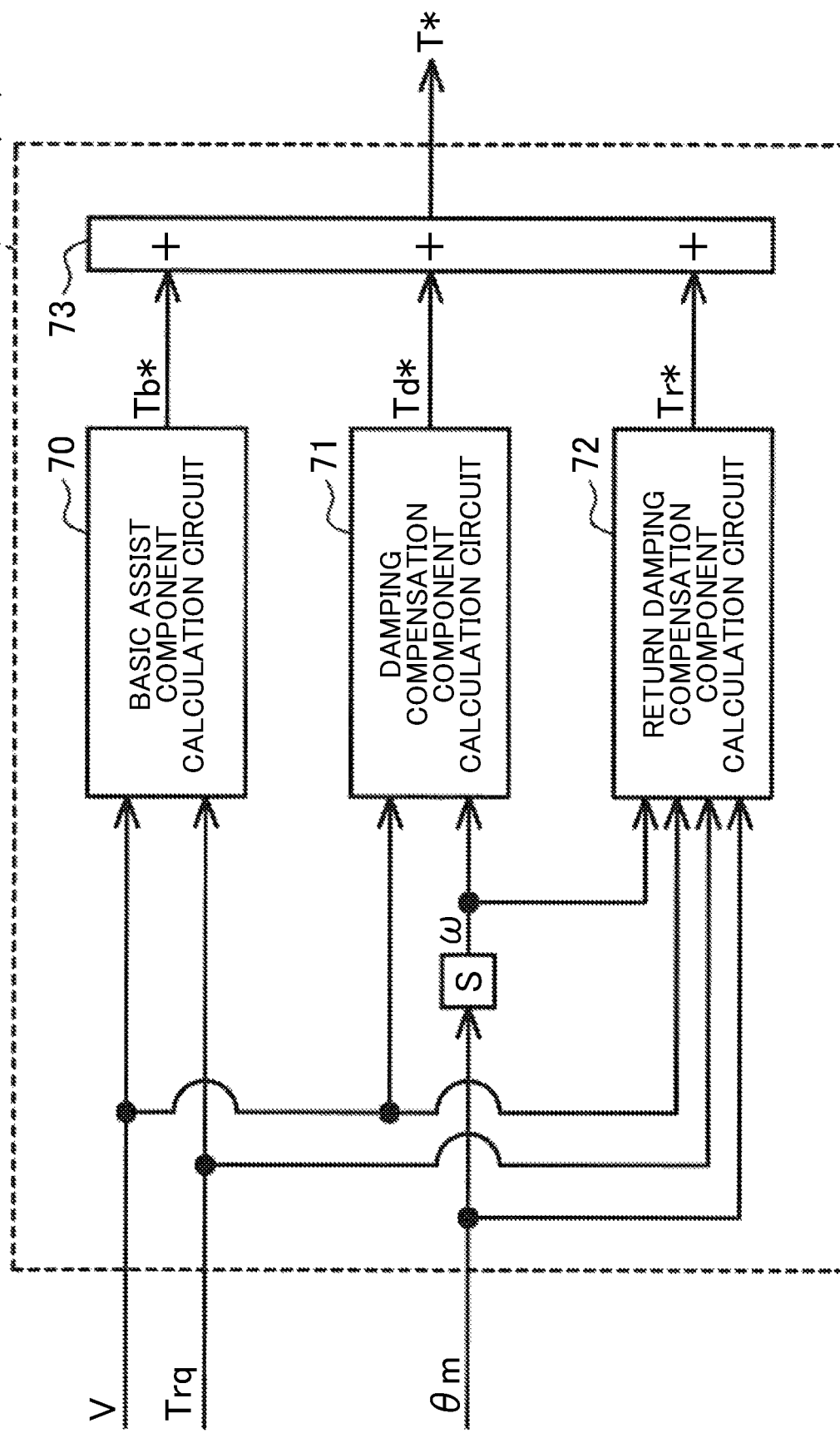
FIG. 3 is a block diagram illustrating the function of a torque command value calculation circuit of a steering control unit of the electric power steering system.

The function of the torque command value calculation circuit 53 is described here in more detail. As illustrated in FIG. 3, the torque command value calculation circuit 53 includes the following: a basic assist component calculation circuit 70 that calculates (generates) a basic assist component Tb*; and a damping compensation component calculation circuit 71 that calculates (generates) a damping compensation component Td*. The torque command value calculation circuit 53 further includes a return damping compensation component calculation circuit (hereinafter referred to as the return compensation component calculation circuit) 72 that calculates (generates) a return damping compensation component (hereinafter referred to as the return compensation component) Tr*. The torque command value calculation circuit 53 further includes an adder circuit 73 that calculates (generates) the torque command value T* by adding, to the basic assist component Tb* generated by the basic assist component calculation circuit 70, the damping compensation component Td* generated by the damping compensation component calculation circuit 71 and the return compensation component Tr* generated by the return compensation component calculation circuit 72.

The basic assist component calculation circuit 70 receives the vehicle speed V and the steering torque Trq. On the basis of the vehicle speed V and the steering torque Trq, the basic assist component calculation circuit 70 calculates and generates the basic assist component Tb*. The basic assist component Tb* is a basic component of the assist three that the motor 40 needs to produce. The basic assist component calculation circuit 70 calculates the basic assist component Tb* such that the absolute value of the basic assist component Tb* increases with increasing absolute value of the steering torque Trq and increases with decreasing vehicle speed V.

The damping compensation component calculation circuit 71 receives the vehicle speed V and a rotational angular velocity ω. The rotational angular velocity ω is a derivative of the rotation angle θm with respect to time. Since the rotation angle θm has a correlation with a steering angle θs (refer to FIG. 1) that is a rotation angle of the steering wheel 10 (the steering shaft 11), the steering angle θs is calculable from the rotation angle θm. Thus, since the rotational angular velocity ω has a correlation with a steering velocity ωs that is the rate of change in the steering angle θs of the steering wheel 10, the steering velocity ωs is calculable from the rotational angular velocity ω. The damping compensation component calculation circuit 71 calculates and generates the damping compensation component Td* on the basis of the vehicle speed V and the rotational angular velocity ω. The damping compensation component Td* compensates the basic assist component Tb* to suppress a sudden change (slight fluctuations) in the steering angle θs of the steering wheel 10. That is, the damping compensation component Td* compensates the basic assist component Tb* to make the basic assist component Tb* appropriate for the conditions of the vehicle and the steering mechanism 2. Specifically, the damping compensation component calculation circuit 71 calculates the damping compensation component Td* corresponding to the vehicle speed V at that time, on the basis of the absolute value of the steering velocity ωs that is obtained by conversion from the rotational angular velocity ω. The damping compensation component Td* generated by the damping compensation component calculation circuit 71 is added to the basic assist component Tb* by the adder circuit 73. Thus, the basic assist component Tb* with a direction opposite to the steering velocity ωs at that time is reflected in the torque command value T*.

The return compensation component calculation circuit 72 receives the vehicle speed V, the rotational angular velocity ω, the steering torque Trq, and the rotation angle θm. The return compensation component calculation circuit 72 calculates and generates the return compensation component Tr* on the basis of the vehicle speed V, the rotational angular velocity ω, the steering torque Trq, and the rotation angle θm. The return compensation component Tr* is calculated independently of the damping compensation component Td* generated by the damping compensation component calculation circuit 71. The return compensation component Tr* compensates the basic assist component Tb* to suppress the influence of the damping compensation component Td*.

According to the embodiment, the effect of the damping compensation component Td* works also in a situation where, after being turned, the steering wheel 10 comes back to a neutral position of the steering wheel 10 by the action of self-aligning torque, without a steering operation that a driver performs to return the steering wheel 10. In this case, the effect of the damping compensation component Td* works to reduce the sudden change in the steering angle θs that occurs when the steering wheel 10 comes back to the neutral position, thus interfering with the action of self-aligning torque. This may cause a decrease in the speed of the steering wheel 10 coming back to the neutral position. According to the embodiment, in order to suppress the influence of the damping compensation component Td* generated by the damping compensation component calculation circuit 71, both the damping compensation component Td* and the return compensation component Tr* are reflected in the torque command value T* in the situation where the steering wheel 10 comes back to the neutral position.

Figure 4:
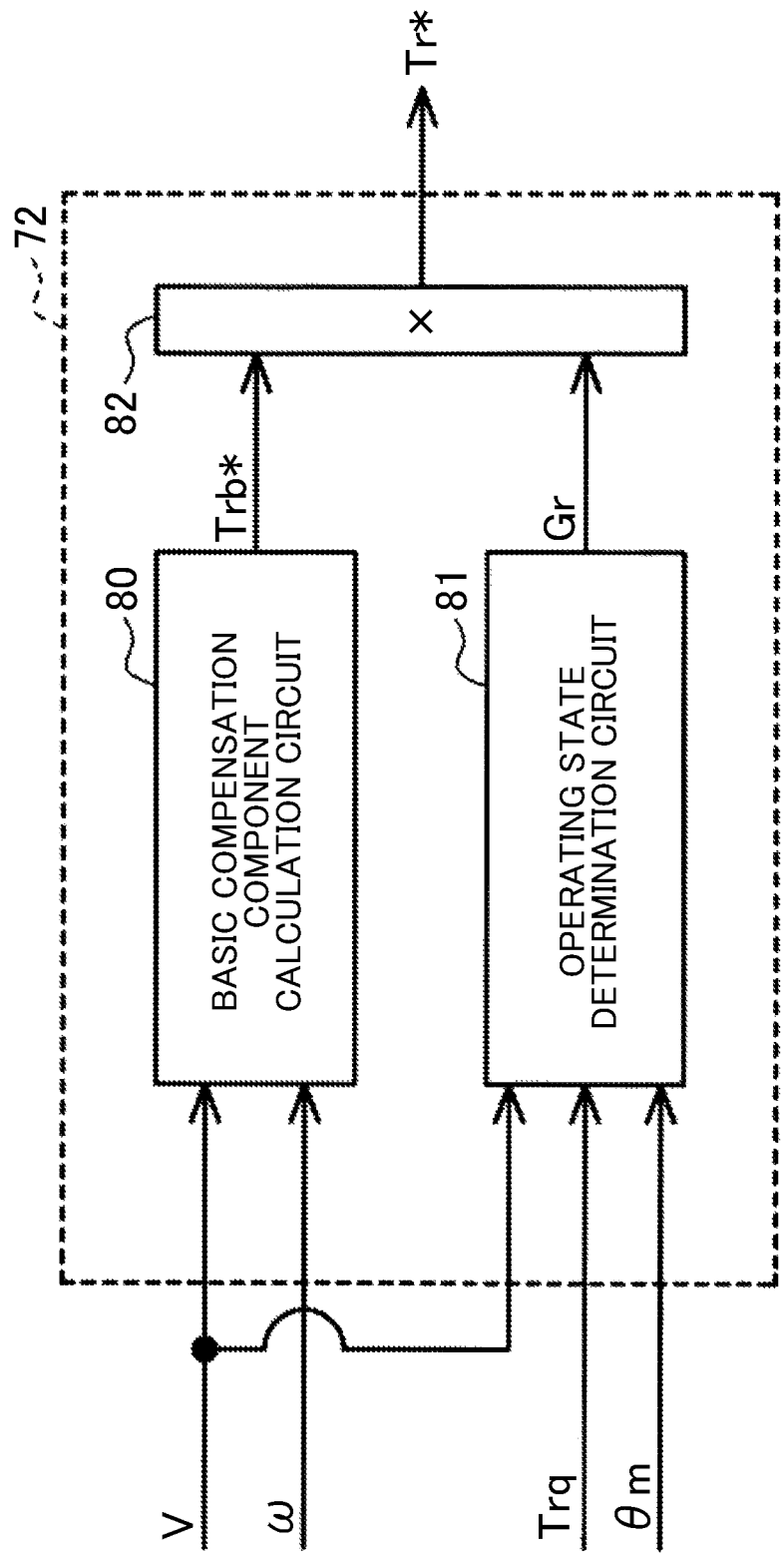
FIG. 4 is a block diagram illustrating the function of a return damping compensation component calculation circuit of the torque command value calculation circuit.

Specifically, as illustrated in FIG. 4, the return compensation component calculation circuit 72 includes a basic compensation component calculation circuit 80 that calculates (generates), on the basis of the vehicle speed V and the rotational angular velocity ω, a basic return compensation component Trb* that is a basis component of the return compensation component Tr*. Specifically, the basic compensation component calculation circuit 80 calculates the basic return compensation component Trb* corresponding to the vehicle speed V at that time, on the basis of the absolute value of the steering velocity ω that is obtained by conversion from the rotational angular velocity ω. The basic return compensation component Trb* is calculated such that the basic return compensation component Trb* has a direction opposite to the direction of the damping compensation component Td* that is generated on the basis of the vehicle speed V and the rotational angular velocity ω at that time. According to the embodiment, the basic return compensation component Trb* is equal in absolute value to the damping compensation component Td* that is generated on the basis of the vehicle speed V and the rotational angular velocity ω at that time. Thus, the basic return compensation component Trb* and the damping compensation component Td* cancel out each other.

The return compensation component calculation circuit 72 further includes an operating state determination circuit 81. The operating state determination circuit 81 determines, on the basis of the vehicle speed V, the steering torque Trq, and the rotation angle θm, whether the steering wheel 10 is in the situation where, after being turned, the steering wheel 10 comes back to the neutral position without the steering operation that a driver performs to return the steering wheel 10. Specifically, the operating state determination circuit 81 determines whether the steering torque Trq is smaller than a force required to perform the steering operation that returns the steering wheel 10 to steer the steered wheels 15, thereby determining whether the steering wheel 10 is in the situation where the steering wheel 10 comes back to the neutral position. In the vehicle, the force required to perform the steering operation that turns or returns the steering wheel 10 is empirically calculable on the basis of the vehicle speed V and the rotation angle θm (the steering angle θs).

Figure 5A:
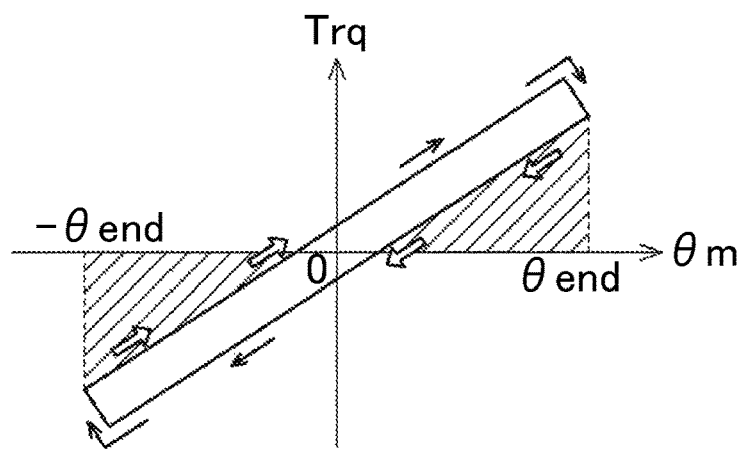
FIGS. 5A to 5C are diagrams used to describe how an operating state determination circuit of the return damping compensation component calculation circuit determines an operating state.
Figure 5B:
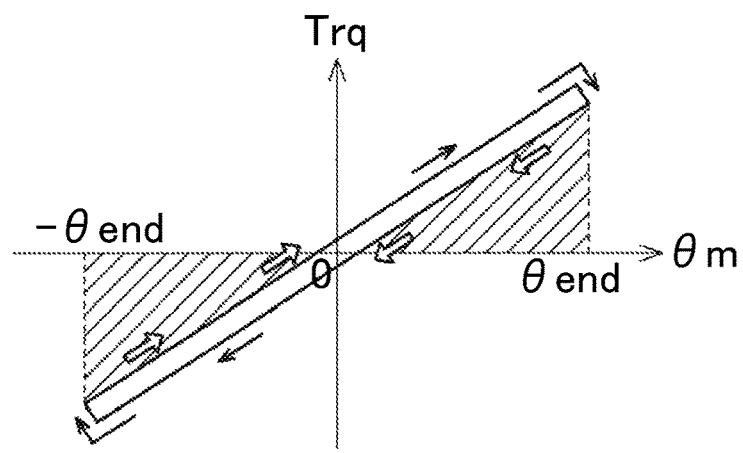
Figure 5C:
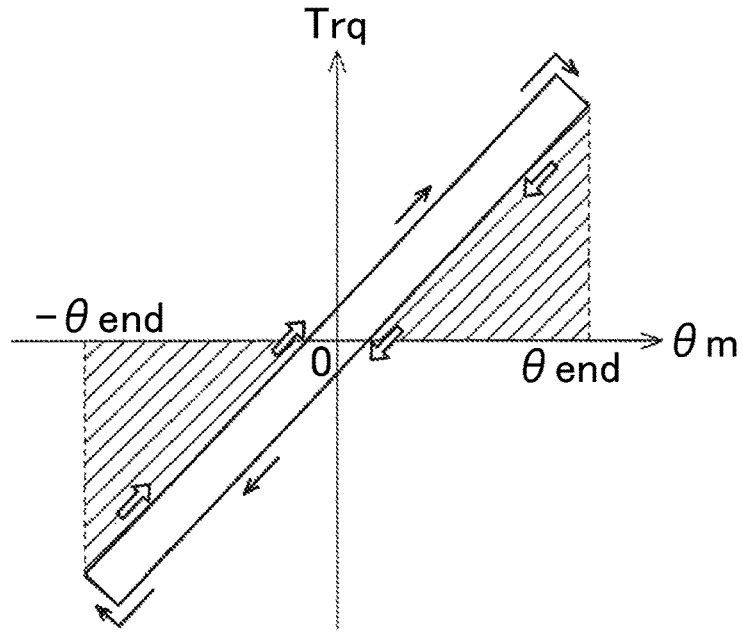

FIGS. 5A to 5C illustrate examples of characteristics of the force required to operate the steering wheel 10 with respect to the rotation angle θm (the steering angle θs), on the assumption that the required force has a positive value when the steering wheel 10 rotates in a first direction and has a negative value when the steering wheel 10 rotates in a second direction opposite to the first direction. As can be seen from FIGS. 5A to 5C, the absolute value of the force required to operate the steering wheel 10 is smaller when the steering wheel 10 is returned (refer to outlined arrows in the drawings) than when the steering wheel 10 is turned (refer to solid arrows in the drawings). When the steering wheel 10 is turned (refer to the solid arrows in the drawings), the absolute value of the force required to operate the steering wheel 10 increases as the rotation angle θm approaches maximum rotation angles ±θend from zero corresponding to the neutral position of the steering wheel 10. When the steering wheel 10 is returned (refer to the outlined arrows in the drawings), the absolute value of the force required to operate the steering wheel 10 decreases as the rotation angle θm approaches zero from the maximum rotation angles ±θend.

When the steering torque Trq is smaller in absolute value than the force required to perform the steering operation that returns the steering wheel 10, as shown hatched in FIGS. 5A to 5C, it is determinable that the steering wheel 10 is in the situation where the steering wheel 10 comes back to the neutral position. In this case, in particular, when the steering torque Trq and the rotation angle θm have the same sign, it is determinable that the steering wheel 10 is in the situation where the steering wheel 10 comes back to the neutral position by the action of self-aligning torque. In contrast, when the steering torque Trq and the rotation angle θm have different signs, it is determinable that self-aligning torque is too small to work or the steering wheel 10 is basically operated by a driver during traveling the vehicle.

The embodiment is based on the presumption that the characteristics of the force required to operate the steering wheel 10 are such that the difference in the required force between when the steering wheel 10 is turned and when the steering wheel 10 is returned is smaller when the vehicle speed V has a value V2 (corresponding to FIG. 5B) than when the vehicle speed V has a value V1 (corresponding to FIG. 5A). It is further presumed that the characteristics of the force required to operate the steering wheel 10 are such that the increasing and decreasing gradients of the absolute value of the required force when the steering wheel 10 is turned or returned are greater when the vehicle speed V has a value V3 (corresponding to FIG. 5C) than when the vehicle speed V has the value V1 (corresponding to FIG. 5A).

The operating state determination circuit 81 determines that the steering wheel 10 is in the situation where the steering wheel 10 comes back to the neutral position, when the following conditions are both satisfied: the steering torque Trq and the rotation angle θm have the same sign; and the steering torque Trq is smaller (in absolute value) than the force required to perform the steering operation that returns the steering wheel 10. In this case, the operating state determination circuit 81 calculates and sets the return compensation gain Gr to one. In contrast, the operating state determination circuit 81 determines that the steering wheel 10 is in a situation where the steering wheel 10 is being operated by a driver (i.e., determines that the steering wheel 10 is not in the situation where the steering wheel 10 comes back to the neutral position), when the following conditions are both satisfied: the steering torque Trq and the rotation angle θm have the same sign; and the steering torque Trq is not smaller (in absolute value) than the force required to perform the steering operation that returns the steering wheel 10. In this case, the operating state determination circuit 81 calculates and sets the return compensation gain Gr to zero. When the steering torque Trq and the rotation angle θm have different signs, the operating state determination circuit 81 calculates and sets the return compensation gain Gr to zero, regardless of the value of the steering torque Trq.

The return compensation component calculation circuit 72 further includes a multiplier circuit 82 that calculates (generates) the return compensation component Tr* by multiplying the basic return compensation component Trb*, generated by the basic compensation component calculation circuit 80, by the return compensation gain Gr set by the operating state determination circuit 81.

When it is determined that the steering wheel 10 is in the situation where the steering wheel 10 comes back to the neutral position, the return compensation component calculation circuit 72 generates the basic return compensation component Trb* as the return compensation component Tr*, thus causing the return compensation component Tr* to function to suppress the influence of the damping compensation component Td*. In contrast, when it is not determined that the steering wheel 10 is in the situation where the steering wheel 10 comes back to the neutral position, the return compensation component calculation circuit 72 generates a zero value, regardless of the value of the basic return compensation component Trb*, as the return compensation component Tr*, thus causing the return compensation component Tr* to function not to suppress the influence of the damping compensation component Td*. The return compensation component Tr* generated by the return compensation component calculation circuit 72 is added to the basic assist component Tb* by the adder circuit 73. Thus, the return compensation component Tr* with a direction opposite to the damping compensation component Td* is reflected in the torque command value T*.

While the thus configured microcomputer 51 controls the driving of the motor 40, the return compensation component calculation circuit 72 repeatedly generates the return compensation component Tr* at predetermined intervals, on the basis of the vehicle speed V, the rotational angular velocity ω, the steering torque Trq, and the rotation angle θm. As such, while controlling the driving of the motor 40, the microcomputer 51 repeatedly performs, at predetermined intervals, processing that compensates the basic assist component Tb* to suppress a sudden change in the steering angle θs and that suppresses the influence of the damping compensation component Td* in the situation where the steering wheel 10 comes back to the neutral position.

The effects and advantages of the embodiment are described below. (1) According to the embodiment, in the situation where the steering wheel 10 comes back to the neutral position without the steering operation that a driver performs to return the steering wheel 10, both the damping compensation component Td* and the return compensation component Tr* are reflected in the torque command value T*, so that the influence of the damping compensation component Td* is suppressed. Thus, the effect of the damping compensation component Td* works in a situation where a driver intentionally operates the steering wheel 10, regardless of whether the steering wheel 10 is turned or returned, but does not work in the situation where the steering wheel 10 comes back to the neutral position. As such, in the situation where the steering wheel comes back to the neutral position, the interference of the damping compensation component Td* with self-aligning torque is suppressed, so that a decrease in the speed of the steering wheel 10 coming back to the neutral position is suppressed. This makes it possible to adjust the speed of the steering wheel 10 coming back to the neutral position, without affecting a steering feel, thus allowing adjustment of the speed of the steering wheel 10 coming back to the neutral position while improving a steering feel.

(2) The situation where the steering wheel 10 comes back to the neutral position may occur regardless of whether a driver holds the steering wheel 10. For example, a situation where a driver holds the steering wheel 10 with a force that is sufficiently small may be considered to be the situation where the steering wheel 10 comes back to the neutral position without the steering operation that a driver performs to return the steering wheel 10.

Therefore, according to the embodiment, the microcomputer 51 determines whether the steering wheel 10 is in the situation where the steering wheel 10 comes back to the neutral position, on the basis of the steering torque Trq and the rotation angle θm. This makes it possible to suppress the interference of the damping compensation component Td* with self-aligning torque and thus to suppress a decrease in the speed a the steering wheel 10 coming back to the neutral position, even when a driver holds the steering wheel 10 in the situation where the steering wheel 10 comes back to the neutral position. Thus, since the return compensation component Tr* is applied appropriately, it is possible to effectively deal with the decrease in the speed of the steering wheel 10 coming back to the neutral position.

(3) Specifically, when the steering torque Trq is smaller than a force that is presumed, on the basis of the vehicle speed V and the rotation angle θm, to be required to perform the steering operation that returns the steering wheel 10, the microcomputer 51 determines that the steering wheel 10 is in the situation where the steering wheel 10 comes back to the neutral position. This makes it possible to accurately determine whether the steering wheel 10 is in the situation where the steering wheel 10 comes back to the neutral position by action of self-aligning torque, even when a driver holds the steering wheel 10. Thus, this makes it possible to more effectively deal with the decrease in the speed of the steering wheel 10 coming back to the neutral position.

The embodiment described above may be modified in various ways. Some examples of the modifications are described below. The operating state determination circuit 81 may determine that the steering wheel 10 is in the situation where the steering wheel 10 comes back to the neutral position, when the following conditions are both satisfied: the steering torque Trq and the rotation angle θm have different signs; and the steering torque Trq is smaller (in absolute value) than the force required to perform the steering operation that returns the steering wheel 10.

When the steering torque Trq has a zero value, the operating state determination circuit 81 may determine that the steering wheel 10 is in the situation where the steering wheel 10 comes back to the neutral position, regardless of the values of the vehicle speed V and the rotation angle θm. In other words, without using the vehicle speed V or the rotation angle θm, the operating state determination circuit 81 may determine, on the basis of the steering torque Trq, whether the steering wheel 10 is in the situation where the steering wheel 10 comes back to the neutral position.

The operating state determination circuit 81 may determine, on the basis of the rotational angular velocity ω, whether the steering wheel 10 rotates toward the neutral position. If the steering wheel 10 rotates toward the neutral position, the operating state determination circuit 81 may determine, on the basis of the vehicle speed V and the rotation angle θm, Whether the steering wheel 10 is in the situation where the steering wheel 10 comes back to the neutral position. In this case, the operating state determination circuit 81 may determine that the steering wheel 10 rotates toward the neutral position, if the rotational angular velocity ω and the rotation angle θm have different signs.

More characteristics of the force required to perform the steering operation that returns the steering wheel 10 to steer the steered wheels 15 may be presumed, and the operating state determination circuit 81 may determine the operating state of the steering wheel 10 on the basis of the presumed characteristics.

The operating state determination circuit 81 may gradually change the return compensation gain Gr in a range from zero to one in accordance with the vehicle speed V or the rotation angle θm. For example, the operating state determination circuit 81 may change the return compensation gain Gr such that as self-aligning torque increases, i.e., as the vehicle speed V or the rotation angle θm increases, the return compensation gain Gr approaches one.

The return compensation component Tr* generated by the return compensation component calculation circuit 72 may partially cancel the damping compensation component Td*. For example, the basic return compensation component Trb* may be set smaller in absolute value than the damping compensation component Td* that is set rated on the basis of the vehicle speed V and the rotational angular velocity ω at that time. Alternatively, the basic return compensation component Trb* may be variable and become smaller in absolute value than or become equal in absolute value to the damping compensation component Td* depending on the vehicle speed V and the rotational angular velocity ω at that time. In this case, while the basic return compensation component Trb* may be set to a value that cancels the damping compensation component Td* that is generated on the basis of the vehicle speed V and the rotational angular velocity ω at that time, the return compensation gain Gr may be set to a value not greater than one or may change between zero and one inclusive in accordance with the vehicle speed V and the rotational angular velocity ω at that time.

The return compensation component calculation circuit 72 may calculate a gain to be multiplied to the damping compensation component Td*. In this case, the torque command value calculation circuit 53 may include a multiplier circuit that is located between the damping compensation component calculation circuit 71 and the adder circuit 73 and that multiplies the damping compensation component Td* by the gain generated by the return compensation component calculation circuit 72, thereby calculating (generating) a compensated damping-compensation-component Td"*. Likewise, the damping compensation component calculation circuit 71 may calculate a gain to be multiplied to the basic assist component Tb*. When both the damping compensation component calculation circuit 71 and the return compensation component calculation circuit 72 are modified in this way, the torque command value calculation circuit 53 may include, instead of the adder circuit 73, a multiplier circuit that multiplies the basic assist component Tb* by the gains generated by the damping compensation component calculation circuit 71 and the return compensation component calculation circuit 72, thereby calculating (generating) the torque command value T*.

The basic assist component calculation circuit 70 uses at least the steering torque Trq to calculate the basic assist component Tb*. Thus, the basic assist component calculation circuit 70 may calculate the basic assist component Tb* without using the vehicle speed V. Alternatively, the basic assist component Tb* may be calculated on the basis of the steering torque Trq, the vehicle speed V, and other suitable elements. Likewise, the damping compensation component calculation circuit 71 uses at least the rotational angular velocity ω to calculate the damping compensation component Td*. Thus, the damping compensation component calculation circuit 71 may calculate the damping compensation component Td* without using the vehicle speed V or may use other suitable elements to calculate the damping compensation component Td*. Likewise, the basic compensation component calculation circuit 80 of the return compensation component calculation circuit 72 uses at least the rotation angle θm to calculate the basic return compensation component Trb*. Thus, the basic compensation component calculation circuit 80 may calculate the basic return compensation component Trb* without using the vehicle speed V or may use other suitable elements to calculate the basic return compensation component Trb*.

In the embodiment, if the vehicle is equipped with a steering angle sensor for detecting the steering angle θs that changes with rotation of the steering wheel 10, the compensation component calculation circuits 71 and 72 may calculate the compensation components Td* and Tr* by using the steering angle θs that is detected by the steering angle sensor, or by using the steering angular velocity ωs that is obtained by differentiating the steering angle θs with respect to time.

In the embodiment, the electric power steering system 1 is a column type. Alternatively, the electric power steering system 1 may be a rack assist type in which the rotating shaft 41 of the motor 40 that supplies the steering mechanism 2 with the assist force is disposed parallel to the axis of the rack shaft 12, a pinion type, or any other suitable type of electric power steering system.

The modifications described above may be combined in various ways. For example, the modification where the compensation components Td* and Tr* are calculated by using the detection result of the steering angle sensor that detects the steering angle θs that changes with rotation of the steering wheel 10 may be combined with any of the other modifications.

What is claimed is:

1. A steering control unit comprising:
a control circuit that controls driving of a motor on the basis of an operating state quantity that changes in response to a steering operation that a driver performs to turn or return a steering wheel of a steering mechanism so as to steer a steered wheel of a vehicle, the motor being a source of an assist force to be supplied to the steering mechanism, wherein
the control circuit calculates, on the basis of the operating state quantity, a basic assist component that is a basic component of the assist force that the motor produces,
the control circuit calculates, as a compensation component, a damping compensation component that compensates the basic assist component to suppress a sudden change in a steering angle of the steered wheel,
the control circuit calculates, as a compensation component and independently of the damping compensation component, a return damping compensation component on the basis of a rotational angular velocity, the return damping compensation component compensating the basic assist component to suppress influence of the damping compensation component,
the control circuit compensates the basic assist component based on the damping compensation component, in a situation where the steering wheel comes back to a neutral position of the steering wheel with the steering operation that the driver performs to return the steering wheel, and
the control circuit compensates the basic assist component based on both the damping compensation component and the return damping compensation component, in a situation where the steering wheel comes back to a neutral position of the steering wheel without the steering operation that the driver performs to return the steering wheel.

2. The steering control unit according to claim 1, wherein the control circuit determines whether the steering wheel is in the situation where the steering wheel comes back to the neutral position, on the basis of the operating state quantity and the rotation angle of the steered wheel.

3. The steering control unit according to claim 2, wherein the control circuit determines that the steering wheel is in the situation where the steering wheel comes back to the neutral position, when the operating state quantity is smaller than a force that is presumed, on the basis of the rotation angle, to be required for the driver to perform the steering operation that returns the steering wheel to steer the steered wheel.

4. A steering control apparatus for use with a driver that performs a steering operation to turn or return a steering wheel of a steering mechanism so as to steer a steered wheel of a vehicle, the vehicle including a steering assist mechanism having a motor that supplies an assist force to the steering mechanism, the steering control apparatus comprising:
a processor programmed to:
obtain an operating state quantity that changes in response to the steering operation,
calculate a basic assist component of the assist force that is generated by the motor based on the obtained operating state quantity,
calculate a damping compensation component that compensates the basic assist component to suppress a sudden change in a steering angle of the steering wheel,
calculate, independently of the damping compensation component, a return damping compensation component based on a rotational angular velocity, the return damping compensation component compensating the basic assist component to suppress influence of the damping compensation component,
adjust the calculated basic assist component based on the calculated damping compensation component, in a case where the steering wheel comes back to a neutral position of the steering wheel with the steering operation that the driver performs to return the steering wheel,
adjust the calculated basic assist component based on the calculated damping compensation component and the calculated return damping compensation component, in a case where the steering wheel comes back to a neutral position of the steering wheel without the steering operation that the driver performs to return the steering wheel, and
operate the motor of the steering mechanism based on the adjusted basic assist component.

5. The steering control apparatus according to claim 4, wherein the processor determines whether the steering wheel comes back to the neutral position in the case based on the obtained operating state quantity and the rotation angle of the steering wheel.

6. The steering control apparatus according to claim 5, wherein the processor determines that the steering wheel has returned to the neutral position in the case when the obtained operating state quantity is smaller than a predetermined force required for the driver to perform the steering operation that returns the steering wheel to the neutral position based on the rotation angle of the steering wheel.

7. The steering control apparatus according to claim 4, wherein the calculated basic assist component is adjusted based on the calculated damping compensation component and the calculated return damping compensation component only in the case where the steering wheel comes back to a neutral position of the steering wheel without the steering operation that the driver performs to return the steering wheel.

* * * * *